United States Patent
Song et al.

(10) Patent No.: US 9,984,043 B2
(45) Date of Patent: May 29, 2018

(54) METHOD AND APPARATUS FOR ESTIMATING POSITION DISTRIBUTION OF RADIATION EMISSION

(71) Applicant: Samsung Electronics Co., Ltd., Suwon-si (KR)

(72) Inventors: Tae-yong Song, Hwaseong-si (KR); Byung-kwan Park, Seoul (KR); Jae-mock Yi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 672 days.

(21) Appl. No.: 14/060,118

(22) Filed: Oct. 22, 2013

(65) Prior Publication Data
US 2014/0142892 A1    May 22, 2014

(30) Foreign Application Priority Data

Nov. 20, 2012   (KR) .................. 10-2012-0131942

(51) Int. Cl.
*G04F 1/00*        (2006.01)
*G06F 17/18*       (2006.01)

(52) U.S. Cl.
CPC .................... *G06F 17/18* (2013.01)

(58) Field of Classification Search
CPC ......................................................... G06F 17/18
USPC ........................................ 702/176, 180, 181
See application file for complete search history.

(56) References Cited

U.S. PATENT DOCUMENTS

| | | | |
|---|---|---|---|
| 6,775,405 B1 * | 8/2004 | Zhu ..................... | G06K 9/6212 345/419 |
| 8,000,513 B2 | 8/2011 | Defrise et al. | |
| 2004/0264626 A1 * | 12/2004 | Besson ................ | A61B 6/508 378/4 |
| 2006/0006997 A1 * | 1/2006 | Rose-Pehrsson ...... | G08B 17/00 340/522 |
| 2006/0102846 A1 * | 5/2006 | Manjeshwar ......... | G06T 11/005 250/363.03 |
| 2006/0175552 A1 | 8/2006 | Kojima et al. | |
| 2009/0124900 A1 * | 5/2009 | Vandenberghe ...... | G06T 11/005 600/436 |
| 2009/0324042 A1 | 12/2009 | Laurence et al. | |
| 2012/0070050 A1 | 3/2012 | Panin | |
| 2012/0070057 A1 | 3/2012 | Zhang et al. | |
| 2012/0138804 A1 * | 6/2012 | Miyaoka ............. | G01T 1/2985 250/362 |
| 2013/0256536 A1 * | 10/2013 | Kim ..................... | G01T 1/1648 250/362 |

(Continued)

FOREIGN PATENT DOCUMENTS

| KR | 10-2003-0072328 A | 9/2003 |
|---|---|---|
| KR | 10-2010-0103490 A | 9/2010 |
| KR | 10-2011-0121536 A | 11/2011 |

(Continued)

*Primary Examiner* — Eman Alkafawi
(74) *Attorney, Agent, or Firm* — NSIP Law

(57) ABSTRACT

A method and apparatus for estimating a position distribution of radiation emission The method and apparatus include obtaining a time difference between radiations detected by a pair of detectors, and creating a probability distribution function (PDF) indicating the probability of where the radiations actually were or may have been emitted. The PDF may be created based on the time difference and timing resolutions of the pair of detectors.

16 Claims, 5 Drawing Sheets

(56) References Cited

U.S. PATENT DOCUMENTS

2014/0110589 A1\* 4/2014 Wang .................... G01T 1/1648
250/362
2015/0199302 A1\* 7/2015 Qi ........................ G06T 11/006
703/2

FOREIGN PATENT DOCUMENTS

KR 10-2011-0124685 A 11/2011
KR 10-2012-0084076 A 7/2012

\* cited by examiner

METHOD AND APPARATUS FOR ESTIMATING POSITION DISTRIBUTION OF RADIATION EMISSION

CROSS-REFERENCE TO RELATED APPLICATION

This application claims the benefit under 35 U.S.C. § 119(a) of Korean Patent Application No. 10-2012-0131942, filed on Nov. 20, 2012, in the Korean Intellectual Property Office, the entire disclosure of which is incorporated herein by reference for all purposes.

BACKGROUND

1. Field

The following description relates to methods and apparatuses for estimating a position distribution of radiation emission.

2. Description of Related Art

Medical imaging equipment that obtain images of a human body in order to diagnose a patient provide information necessary for disease diagnosis. Methods of medical imaging equipment which are currently being used or developed are largely divided into methods of obtaining an anatomical image or methods of obtaining a physiological image. Examples of imaging technology providing detailed anatomical images of the human body include magnetic resonance imaging (MRI) and computed tomography (CT). Both examples create 2-dimensional (2D) cross-sectional images of the human body or 3-dimensional (3D) images in high resolution using several 2D images. Such images provide precise positions and shapes of internal organs of the human body. An example of physiological imaging technology is positron emission tomography (PET). PET contributes to diagnosing by detecting abnormal metabolic processes from captured images of metabolic processes in the human body.

PET imaging includes using a special radiation tracer emitting positrons as a component participating in human metabolism. The tracer is typically introduced by intravenous injection or inhalation, and the tracer's position is typically traced by detecting two gamma rays of about 511 keV emitted in opposite directions when the positrons emitted from the tracer combine with electrons by an external device. A distribution change depending on a distribution shape and positions of the tracer over time is typically observed.

SUMMARY

In one general aspect, there is provided a method of estimating a position distribution of radiation emission, the method comprising: obtaining a time difference between radiations detected by detectors; and generating a probability of radiation emission for one or more positions based on the time difference and timing resolutions of the detectors.

The generating of the probability of radiation emission may comprise generating a probability distribution function (PDF).

The producing of the PDF may comprise producing an asymmetric Gaussian function based on the timing resolution of each detector.

The detectors may comprise first and second detectors; a width of the PDF in a direction toward the first detector from a center of the PDF may be proportional to a timing resolution of the first detector; and a width of the PDF in a direction toward the second detector from the center of the PDF may be proportional to a timing resolution of the second detector.

The PDF may indicate a probability of radiation emission for each position on a line of response (LOR) connecting the pair of detectors; and the PDF may not indicate the probability of radiation emission at positions where the probability of radiation emission is smaller than a predetermined threshold value.

The method may further comprise determining a center of the PDF on a LOR connecting the pair of detectors based on the time difference.

The method may further comprise readjusting the PDF using a previously trained artificial neural network.

The method may further comprise training the artificial neural network using any one or any combination of a number of radiation emission events, a concentration of the radiation emission events, and the timing resolutions of the detectors.

The readjusting of the PDF may comprise inputting any one or any combination of the number of radiation emission events detected by the detectors, the concentration of the radiation emission events, and a mean of the radiation emission events to the trained artificial neural network; and readjusting a center of the PDF using values output from the artificial neural network.

In another aspect, there is provided an apparatus for estimating a position distribution of radiation emission comprising: a measuring unit configured to obtain a time difference between radiations detected by detectors; and a generating unit configured to generate a probability of radiation emission for one or more positions based on the time difference and timing resolutions of the detectors.

The generated probability of radiation emission may be a probability distribution function (PDF).

The PDF may be an asymmetric Gaussian function based on each timing resolution of the detectors.

The detectors may comprise first and second detectors; a width of the PDF in a direction toward the first detector from a center of the PDF may be proportional to a timing resolution of the first detector; and a width of the PDF in a direction toward the second detector from the center of the PDF may be proportional to a timing resolution of the second detector.

The PDF may indicate a probability of radiation emission for each position on a line of response (LOR) connecting the pair of detectors; and the PDF may not indicate the probability of radiation emission at positions where the probability of radiation emission is smaller than a predetermined threshold value.

The generating unit may be further configured to determine a center of the PDF on a LOR connecting the pair of detectors based on the time difference.

The apparatus may further comprise a function readjusting unit configured to readjust the PDF using a previously trained artificial neural network.

The function readjusting unit may be further configured to train the artificial neural network using any one or any combination of a number of radiation emission events, a concentration of the radiation emission events, and the timing resolutions of the detectors.

The function readjusting unit may be further configured to input any one or any combination of the number of radiation emission events detected by the detectors, the concentration of the radiation emission events, and a mean of the radiation emission events to the trained artificial neural network, and readjust a center of the PDF by using values output from the artificial neural network.

In another aspect, there is provided a non-transitory computer-readable storage medium storing a computer program recorded thereon for enabling a computer to execute the method.

DETAILED DESCRIPTION

Figure 1:
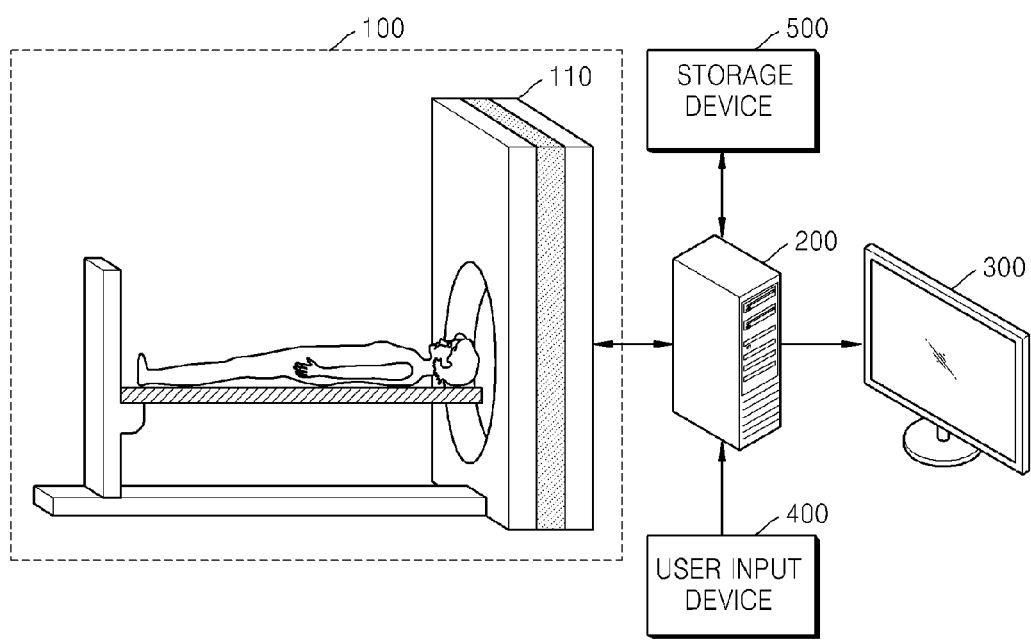
FIG. 1 is a diagram illustrating an example of a medical imaging system.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates an example of a medical imaging system for imaging a subject. Referring to FIG. 1, the medical imaging system may include an imaging device 100, a computer 200, a display device 300, a user input device 400, and a storage device 500.

The medical imaging system illustrated in FIG. 1 may capture and create images of a subject. For example, the imaging device 100 may detect a signal emitted from a tracer injected into the subject. It should be appreciated that the term 'tracer' is used to indicate a material emitting positrons. For example, the imaging device 100 may detect two gamma rays emitted from a tracer injected into the subject. When positrons emitted from a tracer combine with surrounding electrons, two gamma rays are typically emitted in opposite directions as a result of the collision.

The imaging device 100 transmits to the computer 200 line-of-response (LOR) data and time-of-flight (TOF) data describing the position and detection time of the emitted gamma rays. It should be appreciated that LOR data is data corresponding to a straight line position in a space of the emitted gamma rays. LOR data will be described in detail in relation to FIG. 2. The TOF data is data indicating a time elapsed from a time when the radiation is emitted until a time when the radiation is detected. TOF data will be described in detail in relation to FIG. 4.

Figure 2:
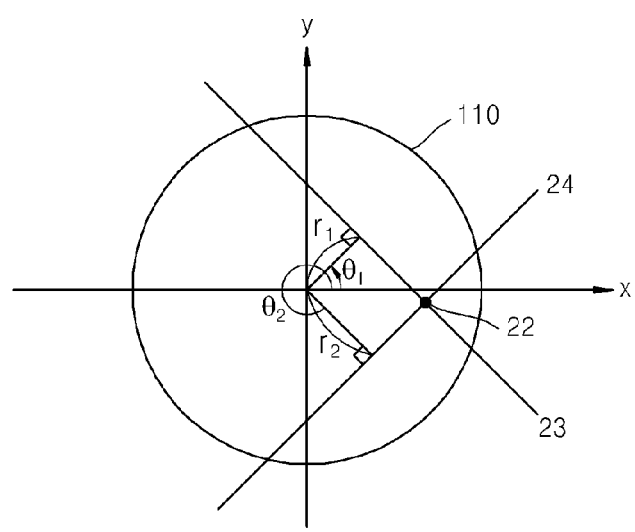
FIG. 2 is a diagram illustrating an example of line-of-response data.

FIG. 2 illustrates an example of two incidents 23 and 24 of gamma rays being emitted in opposite directions to form a straight line. FIG. 2 further illustrates an example of each incident's corresponding LOR data. Referring to FIG. 2, a detecting device 110 may detect two incidents of two gamma rays emitted in opposite directions to each other when positrons emitted from a tracer 22 react with electrons in a patient's body. In these examples, the two gamma rays lie on a single straight line. Referring to the straight line 23, when drawing a perpendicular line to the straight line 23 from an origin within the detecting device 110, a distance to the straight line 23 is $r_1$, and an angle to the perpendicular line is $\theta_1$. Therefore the LOR for the straight line 23 resulting from two gamma rays being emitted is $(r_1, \theta_1)$. In the same manner, referring to straight line 24, when drawing a perpendicular line to the straight line 24 from an origin within the detecting device 110, a distance to the straight line 24 is $r_2$, and an angle to the perpendicular line is $\theta_2$. Therefore the LOR for the straight line 24 resulting from two other gamma rays being emitted is $(r_2, \theta_2)$. As described above, when at least two pieces of LOR data are obtained, a position of the tracer may be determined from the LOR data. As more LOR data is captured, the position of the tracer may be better determined. The imaging device 100 may transmit the LOR data for the detected gamma rays to the computer 200 and the computer 200 may finally determine the position of the tracer from the LOR data.

Referring to FIG. 1 again, the computer 200 may create medical images of the patient using data obtained from the imaging device 100. As an example of a case where medical images of the patient are created using the medical imaging system of FIG. 1, the computer 200 may create cross-sectional images of the patient using the data obtained from the imaging device 100.

The display device 300 may display the medical images created by the computer 200.

A user may input information necessary for an operation of the computer 200 by using the user input device 400. For example, the user may instruct an operation of the computer 200 to start or end.

When the computer 200 creates the medical images for the subject, quality of the medical images may be affected by a spatial resolution and a timing resolution of the detecting device 110. In the example of positron emission tomography (PET), the spatial resolution is determined by an angle fluctuation of gamma rays, a positron range, a geometrical structure of a detector or the like. The timing resolution may be determined by characteristics of the detector.

A first example of a determining factor of spatial resolution is angle fluctuation of gamma rays When two gamma rays are emitted from a tracer with an angle between them that is more than or less than 180°, but not exactly 180°, a resolution of a PET image may degrade. This phenomenon is called angle fluctuation and is described in detail in relation to FIG. 3.

Figure 3:
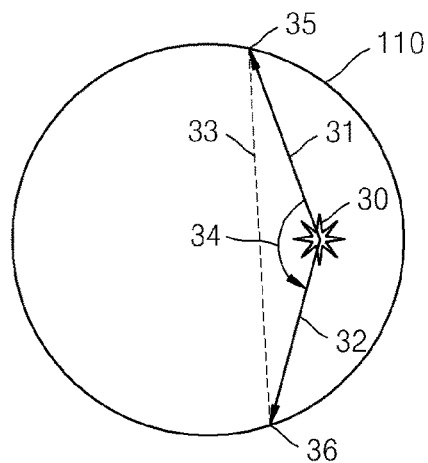
FIG. 3 is a diagram illustrating an example of a case where two gamma rays emitted from a tracer do not form a straight line.

FIG. 3 illustrates an example of a case where two gamma rays do not form a straight line. Unlike the two examples shown in FIG. 2, the two gamma rays 31 and 32 emitted from the tracer 30 do not form an angle of exactly 180°, but form an angle 34 that is smaller than 180°. In this example, the detecting device 110 recognizes positions 35 and 36 where the gamma rays are detected and estimates the tracer to be on a straight line 33 connecting the two positions 35 and 36. However, the tracer does not actually exist on the straight line 33. Degradation in resolution of PET images due to this kind of limitation is known as angle fluctuation and becomes more apparent as the diameter of the detector that is used increases.

Another example of a determining factor of spatial resolution is 'positron range'. When positrons are emitted from a tracer, they typically move from the tracer before reacting with electrons. Therefore, gamma ray emission is detected from the point of positron and electron collision, which may be different from the actual position of the tracer. Accordingly, the resolution of the PET image may degrade. For example, positrons may lose energy while moving a short distance after being emitted from the tracer. The positrons may then collide with electrons and become annihilated to emit a pair of gamma rays having energy of about 511 keV. At this time, a distance that the positrons move while losing energy is called a positron range. As the positrons move within the positron range and emit the gamma rays, the position of the tracer and the position where the gamma rays are emitted do not exactly coincide with each other. Accordingly when the position where the gamma rays are emitted is calculated and is assumed to be the position of the tracer, an error occurs. The degradation of a PET resolution due to this error is called 'positron range effect'. Generally, the positron range increases and the PET image resolution degrades the larger the energy of the positron is.

Another example of a determining factor of spatial resolution is the geometrical structure of the detecting device 110. The spatial resolution may degrade when the detection position is farther away from the center of the detecting device 110. For example, a plurality of detectors may be arranged on a surface of the detecting device 110. When the detectors have a rectangular shape whose longer side extends in a depth direction and a gamma ray is obliquely incident to a detector, the gamma ray may not be detected by a single detector. Rather, the obliquely incident gamma ray may be detected by several adjacent detectors. Accordingly, an exact estimation of a position of the tracer becomes difficult, and the PET image resolution degrades.

Figure 4:
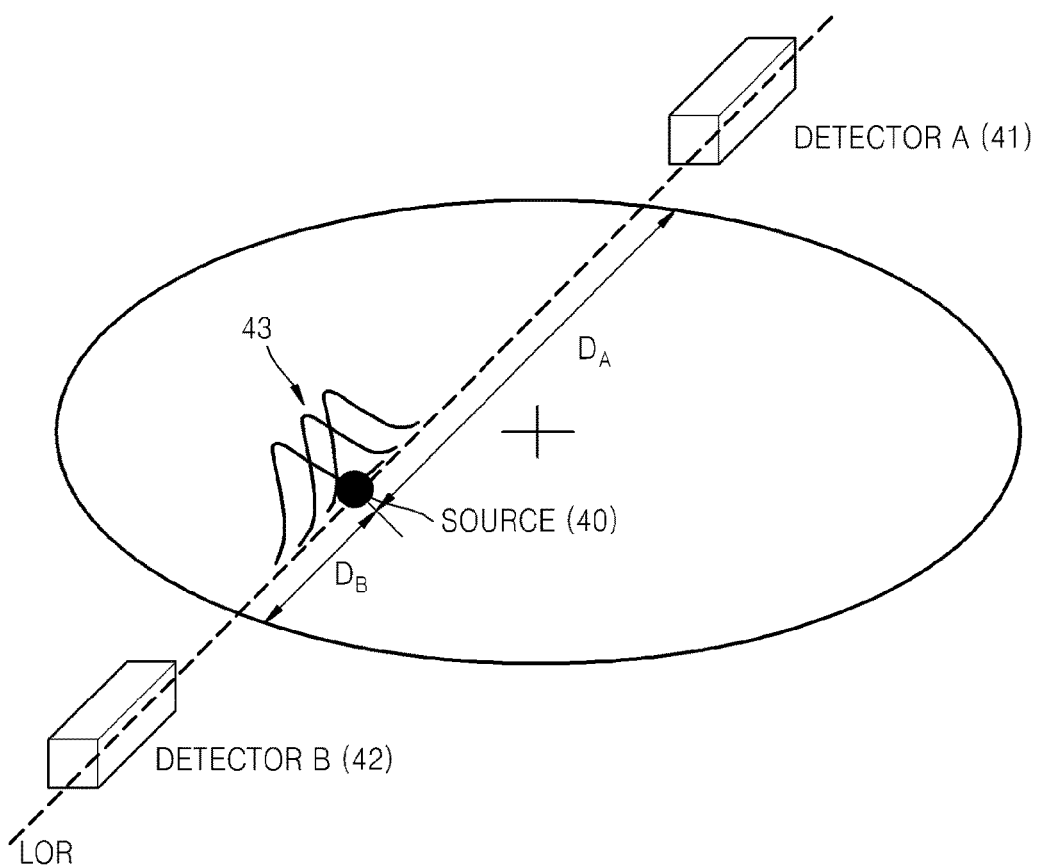
FIG. 4 is a diagram illustrating an example of a process of estimating positions of emitted radiation using time-of-flight (TOF) data.

FIG. 4 illustrates an example of a process for estimating a position of radiation emission using time-of-flight (TOF) data and a probability distribution function (PDF). A source 40 may emit radiation in the form of two gamma rays in a straight line. A pair of detectors, detector A 41 and detector B 42, may detect the emitted radiation. $D_A$ may indicate a distance from the source 40 to the detector A 41, and $D_B$ may indicate a distance from the source to the detector B 42.

In this example, a PDF 43 is a function that may be created by using a detected time difference between radiations detected by the detector A 41 and the detector B 42. The PDF 43 may indicate the probability that the source 40 is in a certain position among one or more positions on the LOR. This probability may be calculated based on the detected time difference between the first detector and second detector. For example, when $D_A$ is longer than $D_B$ and radiation is detected by detector B 42 before being detected by detector A 41, it may be calculated that the source 40 is positioned closer to a detector B 42 by a distance corresponding to the detected time difference.

In this example, since timing resolutions of detector A 41 and detector B 42 may be about 500 picoseconds, the position of the source 40 may not be calculated to an exact degree based on only the detected time difference. Accordingly, a position where the source 40 is estimated to exist may be represented as a probability and expressed as the PDF 43. The PDF 43 may be based on the detected time difference and the timing resolutions of detector A 41 and detector B 42. Referring to FIG. 4, an example of a case where radiations are detected by detector A 41 and detector B 42 is illustrated. Accordingly, the same or similar methods may be applied for estimating the position of radiation emission using other detectors included in the detecting device 110.

Figure 5:
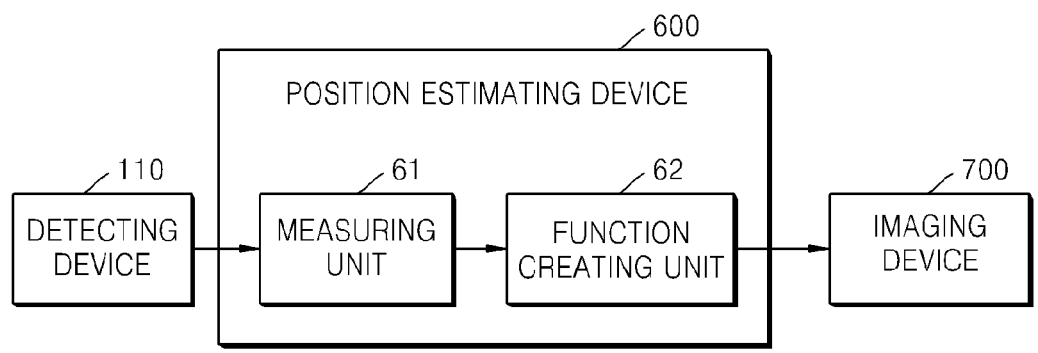
FIG. 5 is a diagram illustrating an example of a position estimation apparatus.

FIG. 5 illustrates an example of a position estimation device 600. The position estimation device 600 may be a separate device or may be incorporated into the imaging device 100, the detecting device 110, or the computer 200 of the medical imaging system shown in FIG. 1. In this example, the position estimation device 600 may include a measuring unit 61 and a function generating unit 62. The measuring unit 61 and the function generating unit 62 may both be incorporated in the position estimation device 600. Alternatively, each may be incorporated separately or together into each of the imaging device 100, the detecting device 110, or the computer 200 of the medical imaging system shown in FIG. 1.

In one example, the measuring unit may measure data using detectors. In another example, the measuring unit may be a data obtaining unit that merely obtains already measured data. Accordingly, the measuring unit may also be referred to as a data obtaining unit. In one example, the function generating unit may produce a function for estimating a position of radiation emission. In another example, the function generating unit may indicate a position of radiation emission without producing a function. Accordingly, the function generating unit may also be referred to as a generating unit, producing unit, a function generating unit, or a function producing unit.

In an example, the measuring unit 61 may obtain a time difference of radiations detected by a pair of detectors in the detecting device 110. The measuring unit 61 may receive signals corresponding to the radiations detected by the pair of detectors and may obtain a time difference between the received signals. For example, detector A and detector B may detect radiations and output signals to the measuring unit indicating that radiations have been detected. The measuring unit 61 may then obtain the time difference of the detected signals by calculating the time difference of the signals received from detector A 41 and detector B 42.

In the example of a PET apparatus, radiations may be two gamma rays emitted when positrons from an introduced tracer collide with surrounding electrons.

The position estimation device 600 of this example may also include a function creating unit. The function creating unit 62 may create a PDF based on the timing resolutions of the detectors and the time difference calculated by and received from the measuring unit 61. The function creating unit may create any other type of function that may indicate the position or probability of position for emission radiation. The function creating unit 62 may determine a mean of the PDF based on the time difference. The function creating unit 62 may determine lateral widths of the PDF in proportion to timing resolutions of the detectors. For example, the function creating unit 62 may create an asymmetrical PDF according to the determined lateral widths. In this example, when the timing resolution of the detector A is larger than the timing resolution of the detector B, the function creating unit 62 may set a lateral width of the PDF for the location near detector A that is wider than the lateral width of the PDF for the location near detector B. In another example, when the timing resolutions of a pair of detectors are identical, the function creating unit 62 may create a symmetrical PDF. In an example, the PDF 43 may be a Gaussian distribution function.

The timing resolutions of the detectors may be characteristic of the detectors and may be varied for each detector. Accordingly, the timing resolution may be previously measured and stored in a storage device 500. For example, the function creating unit 62 may create a PDF on the basis of stored timing resolution information of the detectors which detect the radiations. The function creating unit 62 may read this information from the storage device 500.

The function creating unit 62 may repeats the above described processes for all the detectors which detect radiations. The function creating unit 62 may repeatedly perform the process of creating a PDF for each of the detectors which detect radiations. In this example, the function creating unit 62 may also create a PDF for the entire range of the detecting device 110.

Referring to FIG. 5, the position estimating device 600 may include one or more processors. For example, one of ordinary skill in the art will understand that one or more processors may be implemented with an array of a plurality of logic gates. In another example, one or more processors may be implemented as a combination of a general purpose microprocessor and a memory in which a program capable of being executed by the microprocessor is stored. The one or more processors may also be implemented using other types of hardware.

Still referring to FIG. 5, the image creating device 700 may create images using a PDF received from the position estimating device 600. The PDF received from the position estimating device 600 may be a function created in consideration of the timing resolutions of the detectors. Accordingly, the image creating device 700 may create images having a higher resolution based on the PDF received from the position estimating device 600.

Figure 6:
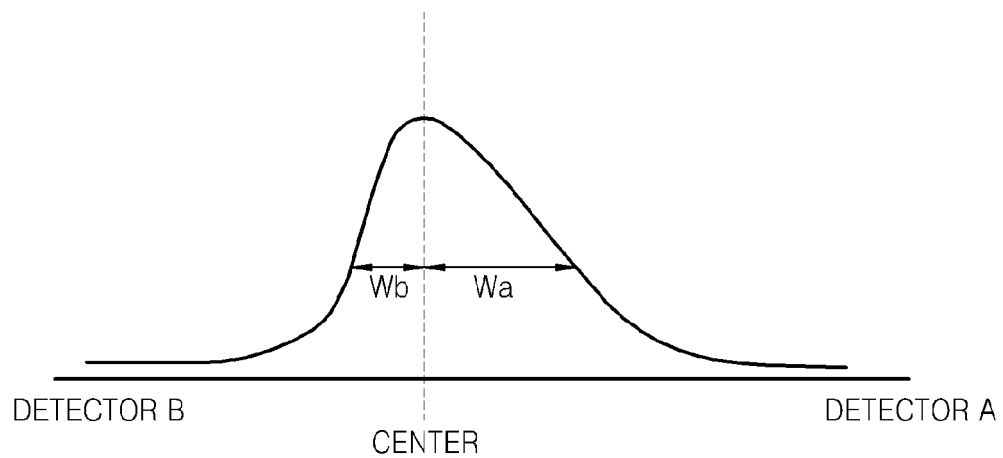
FIG. 6 is a diagram illustrating an example of a probability distribution function.

FIG. 6 illustrates an example of the process whereby the function creating unit 62 creates a PDF in consideration of the timing resolutions of the detectors. The center may be a mean of the PDF and may lie on the LOR connecting detector A and detector B. A mean of the PDF may be calculated as the total sum of each of the values after being multiplied by their respective probabilities. For example, as the center approaches detector A the mean may become smaller, and as the center approaches detector B the mean may become larger.

In an example, the PDF may represent positions where radiations are emitted on the LOR connecting detector A and detector B. That is, the PDF may represent the probability of each of the positions. Referring to FIG. 6, detector A and detector B may correspond to detectors detecting radiations. $W_a$ may correspond to a period where a probability is one or more predetermined values in the PDF, and is a width from the center of the PDF in a direction toward the detector A. $W_b$ may correspond to a period where a probability is one or more predetermined values in the PDF, and is a width from the center of the PDF in a direction toward the detector B. The PDF of FIG. 6 illustrates an example of a case where the timing resolution of detector A is larger than the timing resolution of detector B. Accordingly, in this example, $W_a$ is larger than $W_b$ in the PDF. For example, because a timing resolution being larger may generally indicate that there is a large error in the measured time of detected radiations by a certain detector, this generally results in a larger uncertainty in the calculated position of the emitting source. In this example, this may also result in a larger spread of probabilities where the position of the source may be with respect to a certain detector. Accordingly the PDF in FIG. 6 may be expressed as an asymmetrical function where a width in a direction towards detector A may be larger than a width towards detector B.

Figure 7A:
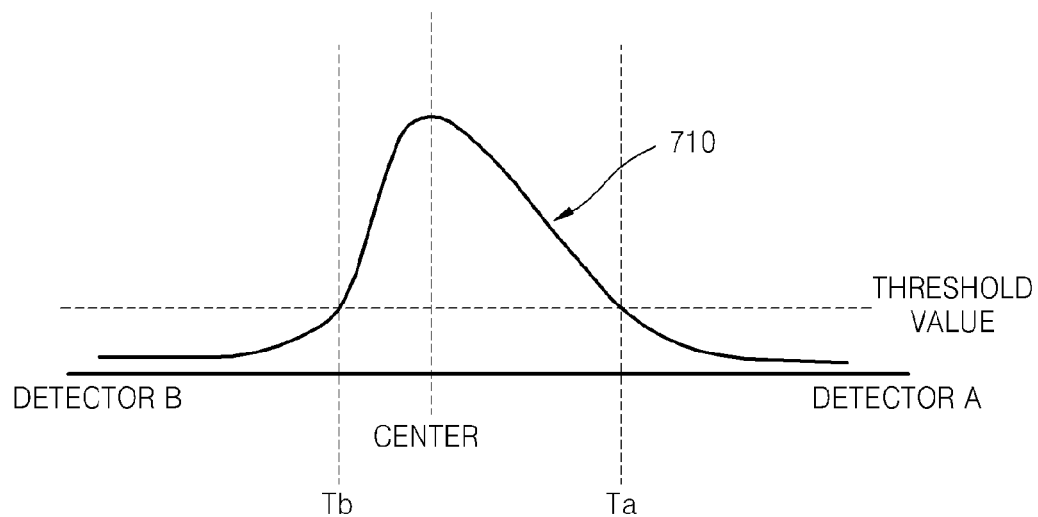
FIGS. 7A and 7B are diagrams illustrating examples of probability distribution functions.
Figure 7B:
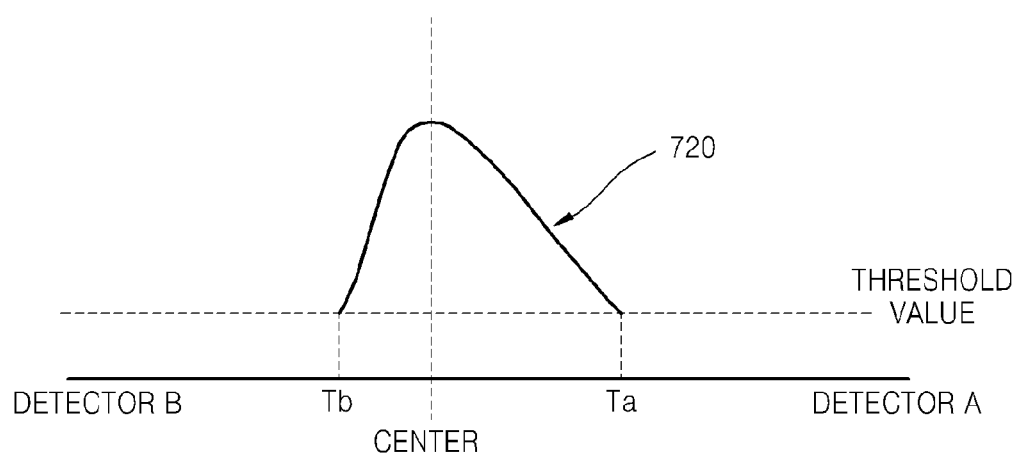

FIGS. 7A and 7B illustrate other examples of a PDF. FIG. 7A illustrates an example of a PDF 710 where a position of a threshold value is indicated. For example, the threshold value may correspond to a predetermined probability. In this example, $T_a$ and $T_b$ may be positions on the LOR and the PDF that have the threshold value.

FIG. 7B illustrates an example of another PDF 720 including only a portion of the PDF 710 of FIG. 7A. In other words, the PDF 720 of FIG. 7B is a function whereby periods having a probability of the threshold value or less are removed from the PDF 710. Accordingly, in this example, the PDF 720 does not have any probability in a period from the position of $T_a$ to the detector A and in a period from the position of $T_b$ to the detector B.

The position estimating device 600 may create a PDF 720 whereby periods having a probability of the previously determined threshold value or less are removed from a PDF 710 having a probability over the entire period. The created PDF 720 may be used for creating an image whose resolution is improved because data in unnecessary periods is removed.

Figure 8:
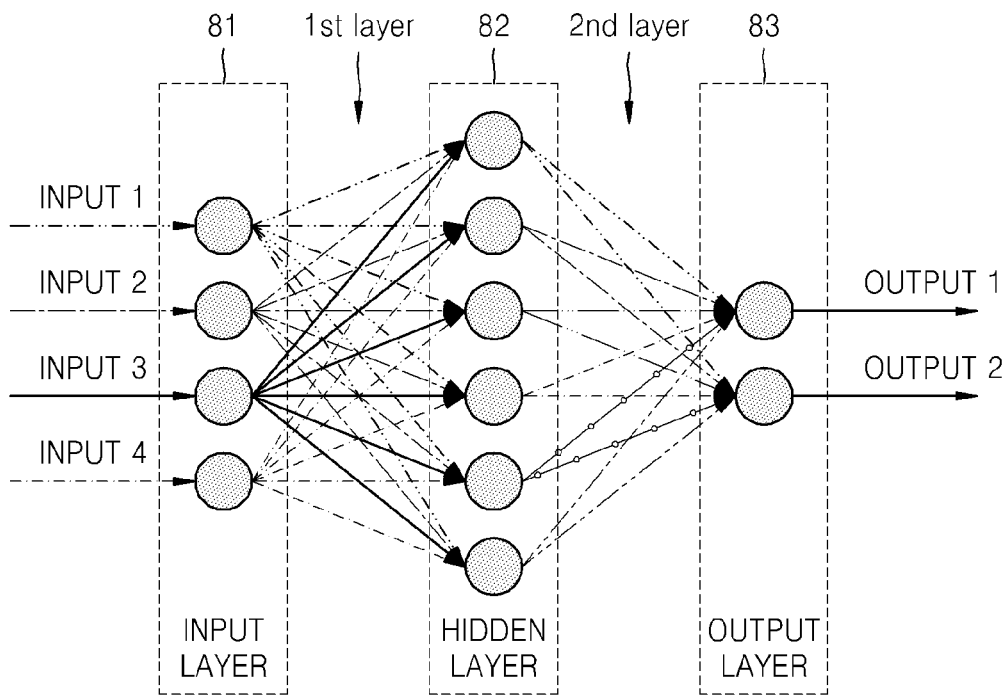
FIG. 8 is a diagram illustrating an example of readjusting a probability distribution function using an artificial neural network.

FIG. 8 illustrates an example of a readjustment of a PDF using an artificial neural network. An artificial neural network is one of a number of methods which train and classify data. Various methods other than the artificial neural network may also be employed. For example, a classification tree may be used. For this example, an artificial neural network may be used.

An example of a neural network, as illustrated in FIG. 8, may include an input layer 81, a hidden layer 82 and an output layer 83. Referring to FIG. 8, the artificial neural network may have a single hidden layer 82 as illustrated. In other examples, an artificial neural network may have a plurality of hidden layers 82 that may be used. In this example, the artificial neural network may have four inputs (input 1 to input 4) and two outputs (output 1 and output 2) as illustrated. In other examples, the numbers of the inputs and the outputs are not limited thereto.

A position adjusting unit (not shown) may readjust the position of the PDF using the artificial neural network. The position adjusting unit may correct the mean of the PDF received from the function creating unit 62.

Prior to adjusting the position of the received PDF, the position adjusting unit may train the artificial neural network. After training the artificial neural network, the position adjusting unit may input data of measured events to the trained artificial neural network to output a mean, and adjust the mean of the PDF using the output mean.

In an example of a training process, the position adjusting unit may previously train the artificial neural network using input training data and output training data. For example, when input training data stored in the storage device 500 is input to the artificial neural network, the position adjusting unit trains the artificial neural network to output the output training data which corresponds to the input training data. In other words, the output training data is fixed to correspond to the input training data.

For example, the input data may include at least one of a concentration of events where radiation is emitted on a predetermined LOR, a concentration of events where radiation is emitted on another LOR, a timing resolution of a pair of detectors on a predetermined LOR, and the number of events that occur on a predetermined LOR. In this example, the input data may be input to the four inputs 1-4. Although these four inputs are described, other types of input data may be used. The input data may be any feature capable of being extracted in relation to the radiation emission events.

In this example, the output data may indicate positions where the actual events occur. For example, the output data may be output from the two outputs 1-2. Although two outputs are illustrated, the number of outputs is not limited thereto. Output values indicating positions where radiation emission events occur may be the output data. In other words, the output values may represent positions on LOR. Accordingly, in an example when a position where the event occurs is determined to be only one position, the number of the output values may be only one value. In another example when it is determined that there are a plurality of positions where the events occur or may have occurred, a plurality of output values may be output. In addition, no output data may indicate a 0 (zero) output value.

The input data may be of various types according to the number of positions where the events occur or the number of event occurrences. The output data may be determined according to the input data.

In the position adjusting process, the position adjusting unit may receive input data from the function creating unit 62 and may output values using the artificial neural network. That is, when the input data is input to the input layer 81 of the trained artificial neural network, the position adjusting unit may readjust the mean of the PDF by using the output values output from the output layer 83. In this example, the artificial neural network in the position adjusting process is an artificial neural network trained by using the training data. In other examples, a training process may not be used. In an example, the output values of the artificial neural network may be not fixed but calculated by the trained artificial neural network, in a process that is different from the training process.

For example, when the number of output values output from the output layer 83 is one, the position adjusting unit may adjust all PDFs on a predetermined LOR to one PDF having the output value. When the number of output values is two or more, the position adjusting unit may adjust all PDFs on a predetermined LOR to two or more PDFs each having output values. When the output elements are two or more, the events may be estimated to occur at two or more positions on a predetermined LOR.

Figure 9:
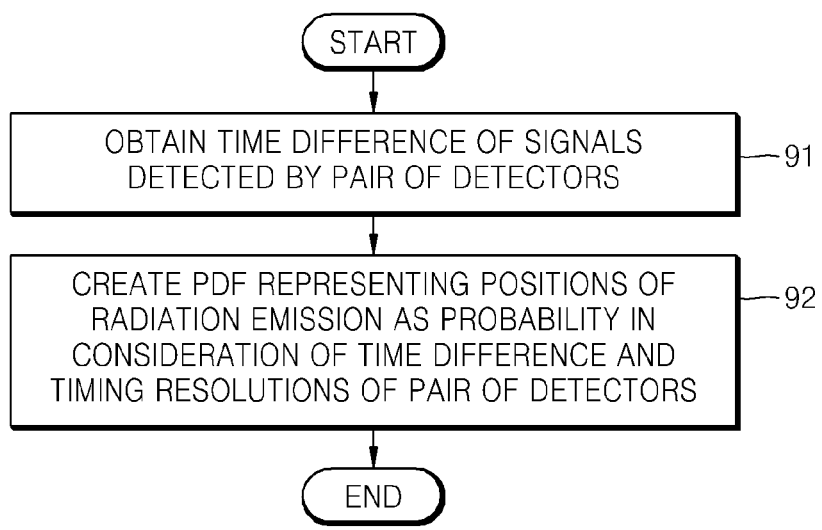
FIG. 9 is a diagram illustrating an example of a method whereby a position estimating device estimates positions where radiations are emitted.

FIG. 9 illustrates an example of a method whereby the position estimating device 600 estimates positions where radiations are emitted. Accordingly, the foregoing description in relation to the position estimating device 600 of FIG. 5 may also be applied to the position estimating method according to the present embodiment as illustrated in FIG. 9.

In operation 91, the position estimating device 600 may obtain a time difference between signals detected by a pair of detectors.

In operation 92, the position estimating device 600 may create a PDF indicating positions where radiations are emitted as a probability based on the time difference and timing resolutions of the pair of detectors. The position estimating device 600 may create a PDF having lateral widths that differ according to the timing resolutions of the detectors.

The position estimating device 600 may repeatedly perform operations 91 and 92 for all the detectors which detect radiations and may create an entire PDF indicating positions where radiations are emitted.

As described above, according to the one or more of the above examples of the present invention, positions where radiations occur may be more precisely estimated, since positions where the radiations are emitted are estimated in consideration of timing resolutions of a pair of detectors detecting the radiations.

In addition, a PDF having periods with a probability smaller than a predetermined threshold value removed may be created, and a resolution-improved image may be obtained as a result.

A PDF may be readjusted to a PDF having a mean value output from an artificial neural network.

In addition, other examples of the present invention can also be implemented through computer readable code/instructions in/on a medium, e.g., a computer readable medium, to control at least one processing element to implement any of the above described examples. The medium can correspond to any medium/media permitting the storage and/or transmission of the computer readable code.

The imaging device 100, computer 200, display device 300, user input device 400, storage device 500, position estimating device 600, and detecting device 110 described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of estimating a position distribution of radiation emission, the method comprising:
   acquiring a previously stored timing resolution of each of a pair of detectors;
   obtaining a time difference between radiations detected by the pair of detectors;
   generating a probability of radiation emission for a position based on the time difference and on the timing resolution of each of the pair of detectors; and
   generating an image using the generated probability of radiation emission, wherein the generating of the probability of radiation emission comprises generating an asymmetrical probability distribution function (PDF);
   wherein the pair of detectors comprises a first and a second detector;
   a width of the PDF in a direction toward the first detector from a center of the PDF is stretched based on a timing resolution of the first detector; and
   a width of the PDF in a direction toward the second detector from the center of the PDF is stretched based on a timing resolution of the second detector;
   wherein a width of the asymmetrical PDF in a direction toward the first detector among the pair of detectors having larger timing resolution from a center of the PDF is stretched to compensate for the larger timing resolution of the first detector.

2. The method of claim 1, wherein the producing of the PDF comprises producing an asymmetric Gaussian function based on the timing resolution of each detector.

3. The method of claim 1, wherein
   the PDF indicates a probability of radiation emission for each position on a line of response (LOR) connecting the pair of detectors; and
   the PDF does not indicate the probability of radiation emission at positions where the probability of radiation emission is smaller than a predetermined threshold value.

4. The method of claim 1, further comprising determining a center of the PDF on a LOR connecting the pair of detectors based on the time difference.

5. The method of claim 1, further comprising readjusting the PDF using a previously trained artificial neural network.

6. The method of claim, 5 further comprising training the artificial neural network using any one or any combination of a number of radiation emission events, a concentration of the radiation emission events, or the timing resolutions of the detectors.

7. The method of claim 6, wherein the readjusting of the PDF comprises
inputting any one or any combination of the number of radiation emission events detected by the pair of detectors, the concentration of the radiation emission events, or a mean of the radiation emission events to the trained artificial neural network; and
readjusting a center of the PDF using values output from the artificial neural network.

8. A non-transitory computer-readable storage medium storing a computer program recorded thereon for enabling a computer to execute the method of claim 1.

9. The method of claim 1, wherein the generating of the PDF comprises:
determining, based on the time difference, a position of the PDF on an LOR connecting the pair of detectors; and
determining, based on the timing resolution of each of the pair of detectors, lateral widths of the PDF.

10. The method of claim 1, wherein the timing resolution of each of the pair of detectors indicates a degree of uncertainty in a radiation event detected by a respective detector.

11. An apparatus for estimating a position distribution of radiation emission comprising:
a storage device configured to store a timing resolution of each of a pair of detectors;
a measuring unit configured to obtain a time difference between radiations detected by the pair of detectors;
a generating unit configured to generate a probability of radiation emission for a position based on the time difference and on the timing resolution of each of the pair of detectors; and
an image creator configured to generate an image using the generated probability of radiation emission,
wherein the generated probability of radiation emission is an asymmetrical probability distribution function (PDF),
wherein the pair of detectors comprises a first and a second detector;
a width of the PDF in a direction toward the first detector from a center of the PDF is stretched based on a timing resolution of the first detector; and
a width of the PDF in a direction toward the second detector from the center of the PDF is stretched based on a timing resolution of the second detector;
wherein a width of the asymmetrical PDF in a direction toward the first detector among the pair of detectors having larger timing resolution from a center of the PDF is stretched to compensate for the larger timing resolution of the first detector.

12. The apparatus of claim 11, wherein the PDF is an asymmetric Gaussian function based on each timing resolution of the detectors.

13. The apparatus of claim 11, wherein
the PDF indicates a probability of radiation emission for each position on a line of response (LOR) connecting the pair of detectors; and
the PDF does not indicate the probability of radiation emission at positions where the probability of radiation emission is smaller than a predetermined threshold value.

14. The apparatus of claim 11, further comprising a function readjusting unit configured to readjust the PDF using a previously trained artificial neural network.

15. The apparatus of claim 14, wherein the function readjusting unit is further configured to train the artificial neural network using any one or any combination of a number of radiation emission events, a concentration of the radiation emission events, or the timing resolutions of the detectors.

16. The apparatus of claim 15, wherein the function readjusting unit is further configured to
input any one or any combination of the number of radiation emission events detected by the pair of detectors, the concentration of the radiation emission events, or a mean of the radiation emission events to the trained artificial neural network, and
readjust a center of the PDF by using values output from the artificial neural network.

* * * * *